(12) United States Patent
Faccin et al.

(10) Patent No.: US 8,270,978 B1
(45) Date of Patent: Sep. 18, 2012

(54) METHOD AND APPARATUS FOR PERFORMING A HANDOVER BETWEEN A NON-3GPP ACCESS AND A 3GPP ACCESS USING GN/GP SGSNS

(75) Inventors: Stefano Faccin, Hayward, CA (US); Fan Zhao, Campbell, CA (US); Ameya Damle, Santa Clara, CA (US)

(73) Assignee: Marvell International Ltd., Hamilton (BM)

( * ) Notice: Subject to any disclaimer, the term of this patent is extended or adjusted under 35 U.S.C. 154(b) by 205 days.

(21) Appl. No.: 12/683,348

(22) Filed: Jan. 6, 2010

Related U.S. Application Data

(60) Provisional application No. 61/142,743, filed on Jan. 6, 2009.

(51) Int. Cl.
*H04Q 7/20* (2006.01)
(52) U.S. Cl. ......... 455/438; 455/439; 455/436; 370/331
(58) Field of Classification Search ............... 455/438, 455/439, 436; 370/331
See application file for complete search history.

(56) References Cited

U.S. PATENT DOCUMENTS

| | | | |
|---|---|---|---|
| 2007/0197235 A1* | 8/2007 | Zhang | 455/466 |
| 2008/0316972 A1* | 12/2008 | Shaheen | 370/331 |
| 2009/0129342 A1* | 5/2009 | Hwang et al. | 370/331 |
| 2010/0054207 A1* | 3/2010 | Gupta et al. | 370/331 |
| 2011/0040855 A1* | 2/2011 | Miklos et al. | 709/220 |

* cited by examiner

*Primary Examiner* — Danh Le (57) ABSTRACT

A method and apparatus for performing a handover of a communication session from a non-3GPP access network to a 3GPP access network in which only a Gn/Gp-based Serving GPRS Support Node has been deployed in the 3GPP access network. The method includes establishing the communication session between a user equipment and an Evolved Packet Core through the non-3GPP access network, and performing a handover of the communication session from the non-3GPP access network to the 3GPP access network. Performing the handover includes providing information to the UE of a selected packet data network gateway prior to performing the handover, and providing the information of the selected packet data network gateway from the user equipment to the 3GPP access network during the handover to maintain continuity of the communication session between the user equipment and the Evolved Packet Core.

19 Claims, 10 Drawing Sheets

METHOD AND APPARATUS FOR PERFORMING A HANDOVER BETWEEN A NON-3GPP ACCESS AND A 3GPP ACCESS USING GN/GP SGSNS

CROSS-REFERENCE TO RELATED APPLICATIONS

This disclosure claims the benefit of U.S. Provisional Application No. 61/142,743, filed Jan. 6, 2009, the disclosure of which is incorporated herein by reference.

FIELD

The present disclosure generally relates to wireless networks.

BACKGROUND

The 3rd Generation Partnership Project (3GPP) is a collaboration between groups of telecommunications associations, to make a globally applicable third generation (3G) mobile phone system specification within the scope of the International Mobile Telecommunications-2000 project of the International Telecommunication Union (ITU). The following 3GPP specifications—3GPP TS 23.060 v8.1.0, 3GPP TS 23.402 v8.4.0, and 3GPP TS 23.401 v8.4.0 (which are incorporated herein by reference)—describe techniques for connecting a user equipment (UE) to an Evolved Packet Core (EPC) using either a 3GPP access or a non-3GPP access. There are various types of non-3GPP accesses—e.g., a trusted non-3GPP access and an untrusted non-3GPP access. There are also various types of 3GPP accesses—e.g., E-UTRAN, UTRAN (3G) and GERAN (2G).

Figure 1:
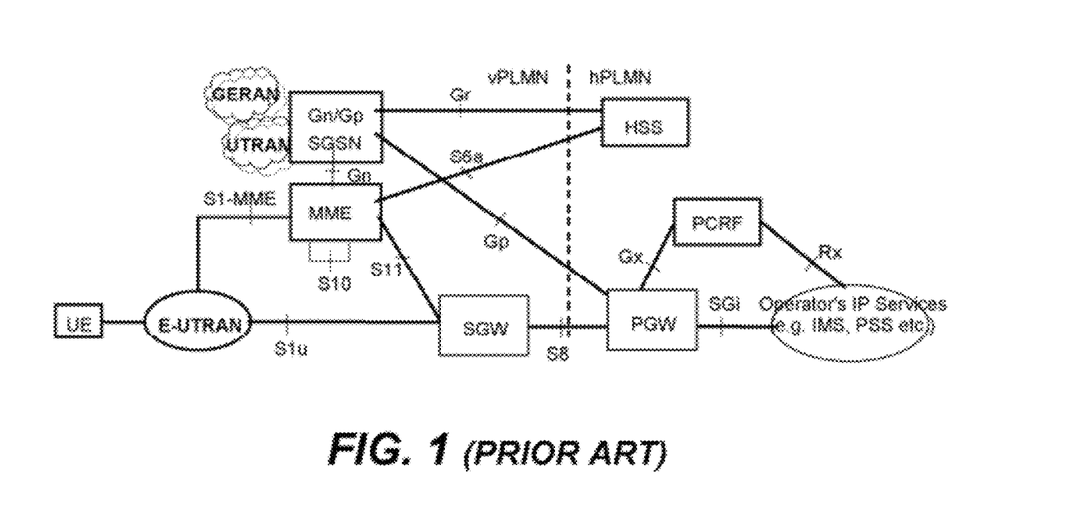
FIG. 1 illustrates a roaming architecture for interoperation with Gn/Gp SGSN.
Figure 2:
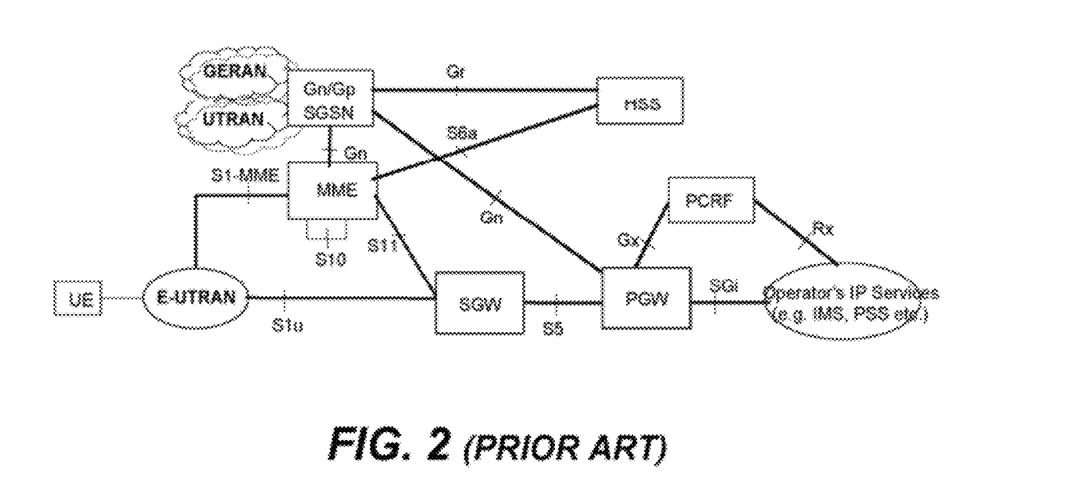
FIG. 2 illustrates a non-roaming architecture for interoperation with Gn/Gp SGSNs.
Figure 3:
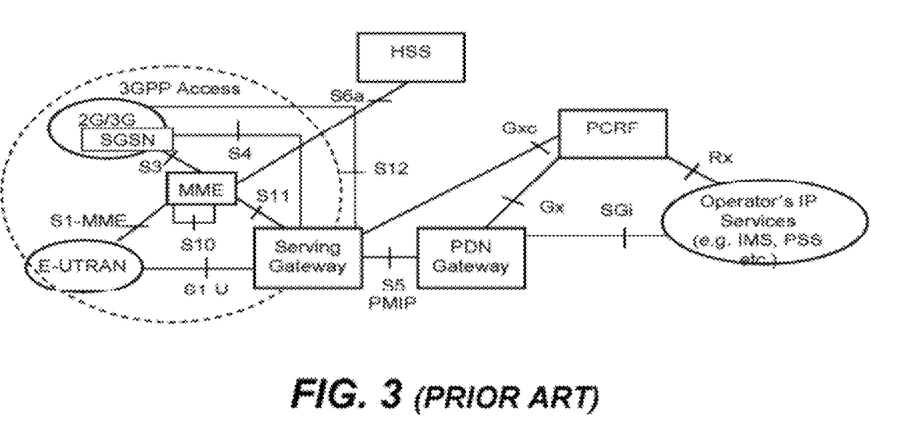
FIG. 3 illustrates a non-roaming architecture for 3GPP accesses within EPS with the S4 SGSN.
Figure 4:
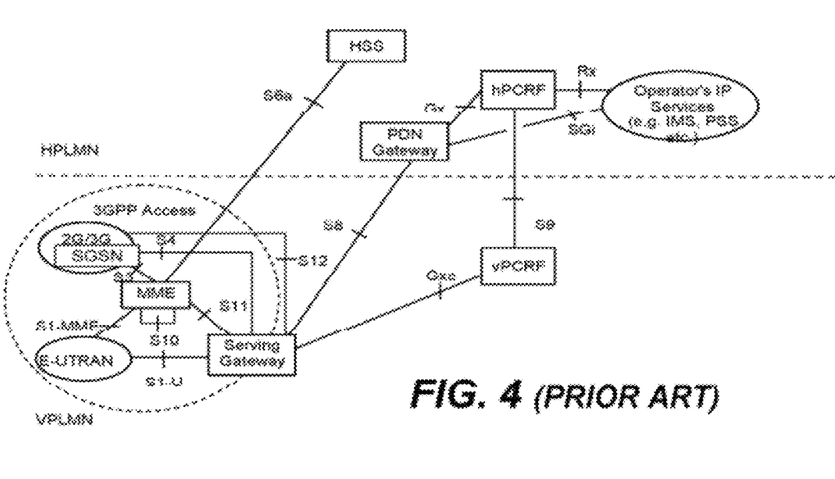
FIG. 4 illustrates a roaming architecture for 3GPP accesses within EPS with the S4 SGSN.

In a 3GPP access network, there can be two types of Serving GPRS Support Nodes (SGSNs) deployed—i.e., the S4 SGSN and the Gn/Gp SGSN. Such SGSNs allow the UE to access the EPC via the UTRAN and the GERAN. FIGS. 1-4 illustrate various architectural models of a 3GPP network. Specifically, FIG. 1 illustrates a roaming architecture for interoperation with Gn/Gp SGSN, FIG. 2 illustrates a non-roaming architecture for interoperation with Gn/Gp SGSNs, FIG. 3 illustrates a non-roaming architecture for 3GPP accesses within EPS with the S4 SGSN, and FIG. 4 illustrates a roaming architecture for 3GPP accesses within EPS with the S4 SGSN.

Figure 5:
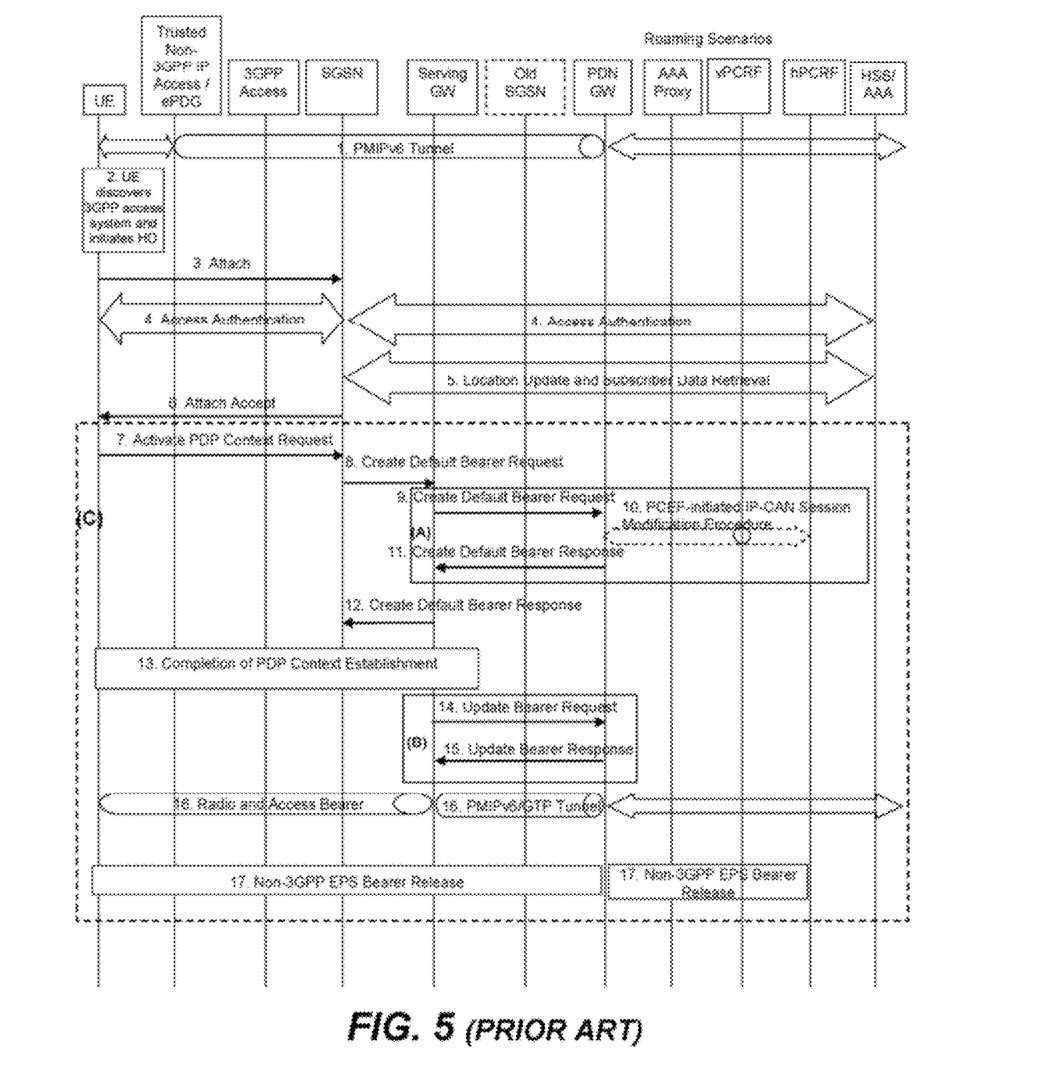
FIG. 5 illustrates a handover procedure from a trusted/untrusted non-3GPP IP access to a UTRAN/GERAN with PMIP on S2a/S2b and GTP based S5/S8.
Figure 6:
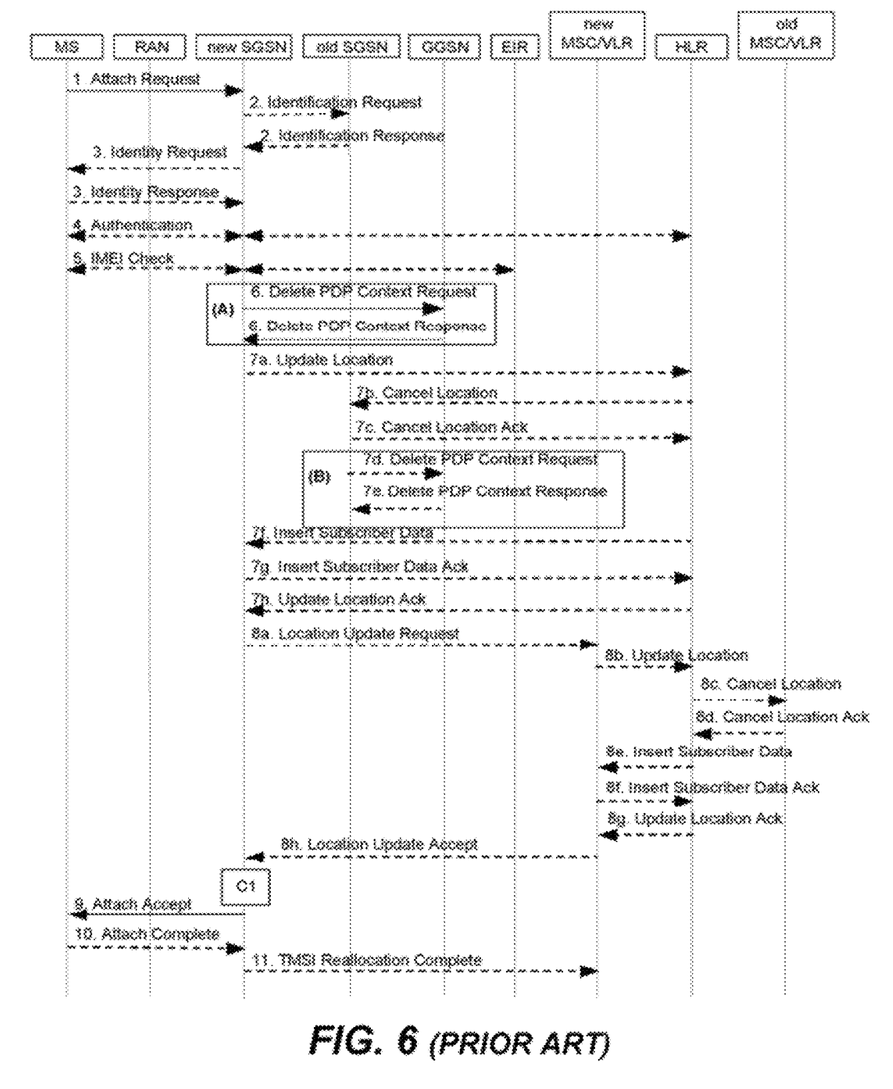
FIG. 6 illustrates a combined GPRS/IMSI attach procedure.
Figure 7:
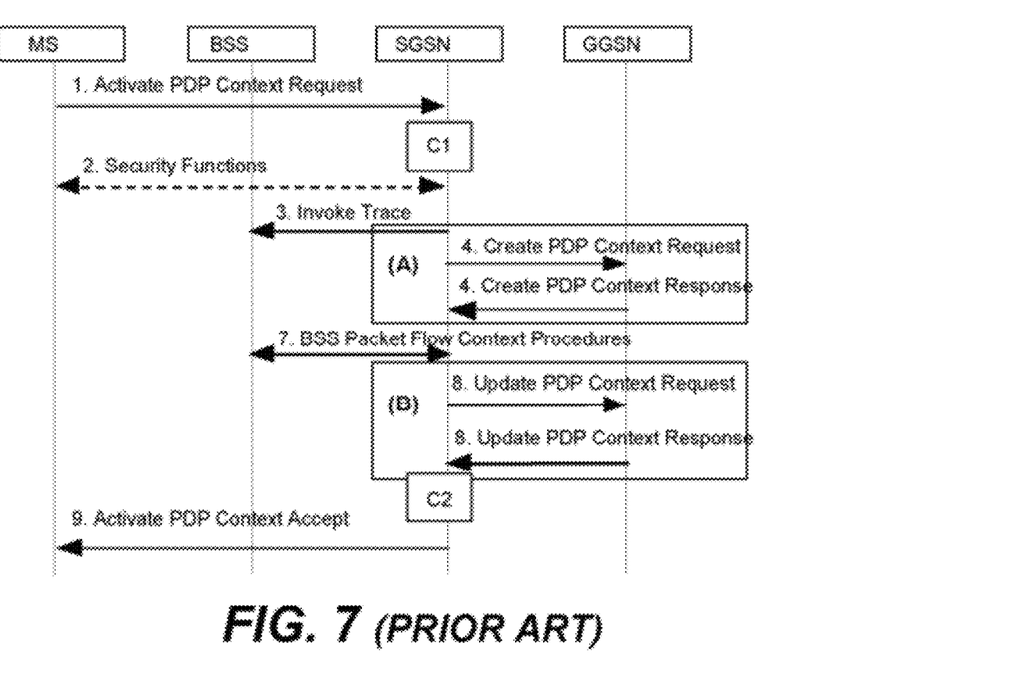
FIG. 7 illustrates a PDP context activation procedure for A/Gb mode.
Figure 8:
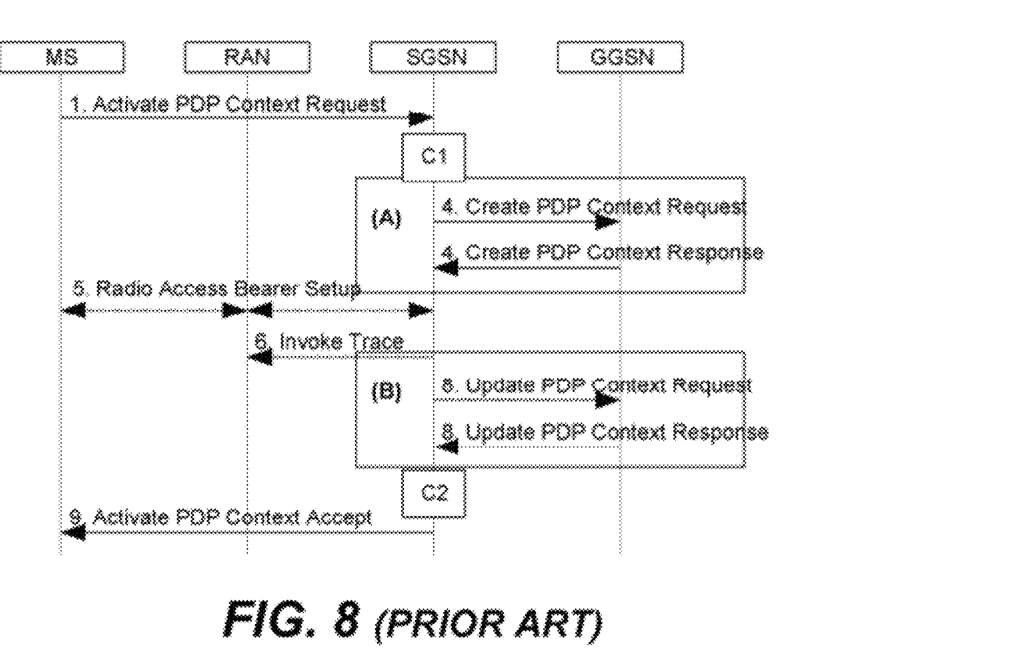
FIG. 8 illustrates a PDP context activation procedure for Iu mode.

The current specifications only define procedures for handover between a non-3GPP access and a 3GPP access with the S4 SGSN. FIG. 5 illustrates a conventional procedure (as described in 3GPP TS 23.402 v8.4.0) when the UE handovers from the trusted/untrusted non-3GPP access to the GTP-based S5/S8 for UTRAN/GERAN with the S4 SGSN. That is, handover between the non-3GPP access and the 3GPP access with the Gn/Gp SGSN is not supported, even though the 3GPP access network with the Gn/Gp SGSN deployed is able to re-connect the UE to the EPC. FIG. 6 illustrates a conventional combined GPRS/IMSI attach procedure 600 with the Gn/Gp based SGSN. FIGS. 7 and 8 respectively illustrate PDP context activation procedures 700, 800 with the Gn/Gp based SGSN for A/Gb mode and Iu mode.

SUMMARY

In general, in one aspect, this specification describes techniques that enable a UE to maintain session continuity during handover between a non-3GPP access network and a 3GPP access network where the Gn/Gp SGSN is deployed. When the UE attaches to a 3GPP access network with the S4 based SGSN deployed, the S4 SGSN provides a specific indication to the serving gateway, and the serving gateway forwards such indication to the PDN GW. Once upon reception of such indication, the PDN GW does not register its identity and the access point name (APN) with the Home Subscriber Server (HSS). When the UE attaches to a 3GPP access network with the Gn/Gp SGSN deployed before handover, the P-GW does not receive such a specific indication from the Gn/Gp SGSN and thus registers its identity and the APN with the HSS. When the UE attaches to a non-3GPP access network via various mobility protocols before handover, the information regarding the selected PDN GW is made available to the UE. The UE provides the information of the selected PDN GW and additional indications to the 3GPP access network during handover to maintain session continuity.

The techniques described herein enable a UE to maintain session continuity during handover between the non-3GPP access and the 3GPP access network where the Gn/Gp SGSN is deployed. Without such techniques, when a UE loses coverage of one (either 3GPP or non-3GPP) wireless access network, the UE cannot handover ongoing sessions and maintain session continuity if the 3GPP access network with the Gn/Gp SGSN deployed is involved in handover.

Some relevant definitions include the following:

Serving Gateway (SGW or S-GW): The SGW is a local mobility anchor for E-UTRAN mobility, switching packets between the S5/S8 interface and the General Radio Packet System (GPRS) Tunneling Protocol (GTP)-based S1-U interface for mobiles in connected mode. For mobiles in idle mode, the SGW is responsible for terminating the down-link data path and when down-link data is received, buffering the data and triggering a paging procedure by signaling the Mobility Management Entity (MME) over the S11 interface.

Mobility Management Entity (MME): The MME is the control-plane function for E-UTRAN access. The MME is responsible for authentication and critical management for mobile devices as well as for tracking and paging procedures for mobiles in idle mode. The MME authorizes bearer activation/deactivation including SGW and Packet Data Network (PDN) gateway selection.

Packet Data Network Gateway (PDN GW or P-GW): The PDN GW is the permanent IP point-of-attachment for access via the E-UTRAN. The PDN GW performs IP policy and charging enforcement on packet flows to and from mobile devices. The same access point name (APN) concepts from the UTRAN PS core network apply, allowing a mobile device to have simultaneous connectivity to multiple PDNs.

Policy Charging Rule Function (PCRF): function to enforce policy rules as specified in, for example, TS 23.203 (which is incorporated herein by reference).

S2 mobility interfaces used to support non-3GPP access networks include:

S2a: Is based on Proxy Mobile IP (PMIP) v6 (RFC 5213—which is incorporated herein by reference). To enable access via legacy trusted non-3GPP access networks (for example, CDMA2000 based networks), S2a also supports Client MIPv4 in FA mode.

S2b: Is based on PMIPv6 and can be seen as an evolution of the TTG concept. In this case an evolved Packet Data Gateway (ePDG) tunnel switches packets between IPsec and PMIPv6 tunnels.

S2c: Is based on Client Mobile IP using Dual Stack MIPv6 (DSMIPv6) as specified in RFC 4877 (which is incorporated herein by reference).

BRIEF DESCRIPTION OF THE DRAWINGS

FIG. 11 illustrates an extended attach procedure to a non-3GPP access with s2a.

DETAILED DESCRIPTION

Figure 9:
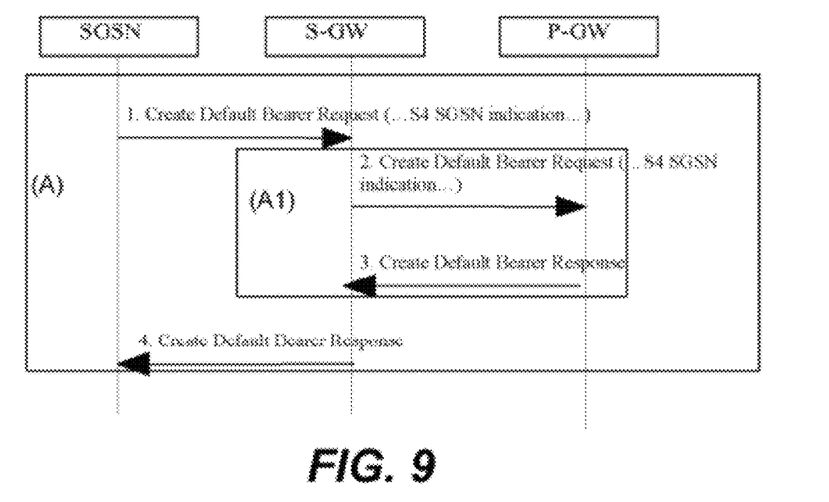
FIG. 9 illustrates an extended step (A) within the PDP context activation procedure using S4.

Extended Procedure when UE First Attaches to a 3GPP Access Network with S4 SGSN Deployed Before Handover FIG. 9 illustrates an extended step (A) in the PDP Context Activation Procedure using S4. Note that the steps shown in the box (A) in FIG. 9, instead of box (A) in the FIGS. 7 and 8, are performed by the UE when the UE attaches to the 3GPP access network with the S4 SGSN. In step 1, the SGSN sends a Create Default Bearer Request ( . . . S4 SGSN indication . . . ) to the S-GW. The S4 SGSN indication is carried in the Create Default Bearer Request as a parameter. In step 2, the S-GW sends a Create Default Bearer Request ( . . . S4 SGSN indication . . . ) to the P-GW. Once receiving the S4 SGSN indication, the P-GW does not register its identity and the corresponding APN with the HSS. In step 3, the P-GW replies with a Create Default Bearer Response to the S-GW. In step 4, the S-GW replies with a Create Default Bearer Response to the SGSN.

Extended Procedure when UE First Attaches to a 3GPP Access Network with Gn/Gp Based SGSN Deployed Before Handover During the procedure performed when the UE attaches the 3GPP access with the Gn/Gp based SGSN deployed, the selected P-GW registers its identity together with the APN with the HSS if such P-GW can provide connectivity via the s2a/s2b/s2c interface when the UE handovers to the non-3GPP access. Such registration can be performed during the PDP context activation procedure. Different from the S4 SGSN, the Gn/Gp SGSN does not send the S4 SGSN indication; therefore, the P-GW knows to perform registration if it does not receive S4 SGSN indication. The current 3GPP specifications allow that the P-GW performs such operations with the HSS if the P-GW supports the s2a/s2b/s2c interface. Since the HSS contains the user subscription data, the HSS will accept such registration from the P-GW if the user subscription indicates that the UE is allowed to handover to the non-3GPP access; otherwise, the HSS does not have to accept such registration.

Figure 10:
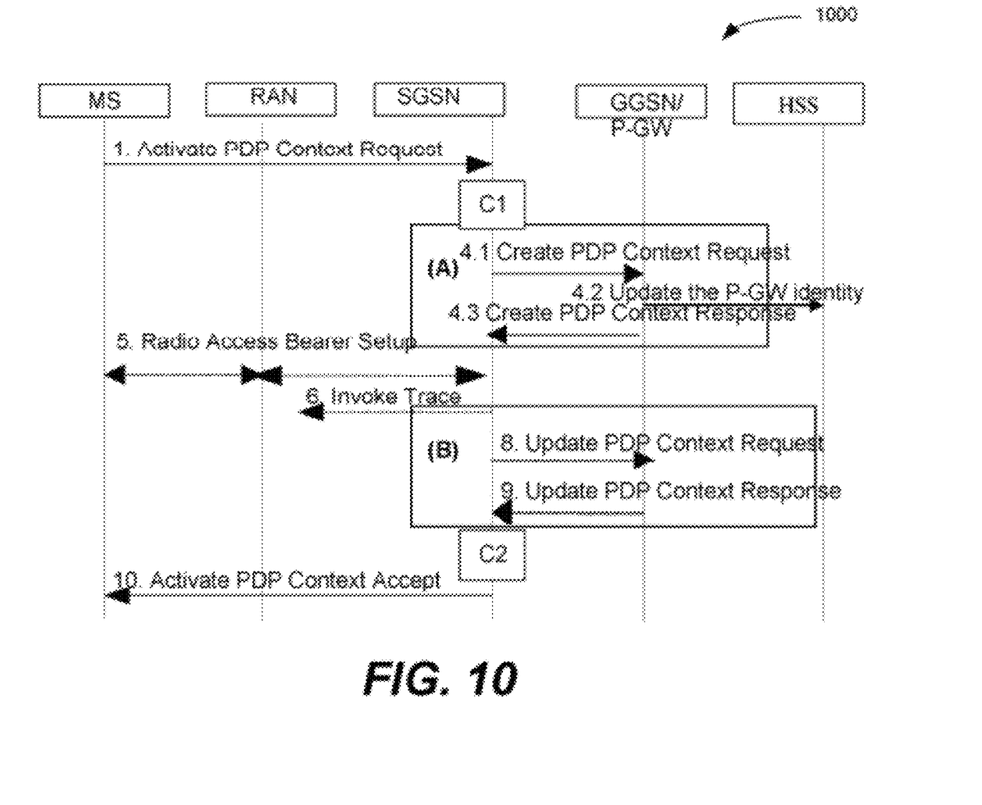
FIG. 10 illustrates an extended PDP context activation procedure for the Iu mode with the GGSN/P-GW registration with the HSS.

FIG. 10 illustrates an extended PDP Context Activation Procedure 1000 for the Iu mode with the GGSN/P-GW registration with the HSS. Compared with the procedure shown in FIG. 8, the only difference is that at step 4.2 the P-GW registers its identity together with the APN to the HSS. Similarly, the PDP Context Activation Procedure for the A/Gb mode can be extended with such a new step.

Handover Procedure from 3GPP Access Network with Gn/Gp Based SGSN Deployed To Non-3GPP Access Network During handover to the non-3GPP access network with the s2a/s2b interface, since the HSS stores the information of the P-GW used when the UE attaches to the 3GPP access with the Gn/Gp SGSN, during the access/tunnel authentication/authorization, the 3GPP AAA server queries the HSS and returns such information regarding the P-GW to the trusted/untrusted non-3GPP access network. During handover to the non-3GPP access network with the s2c interface, the UE performs the bootstrapping procedure to discover the P-GW address. If the discovered P-GW address is different from that stored in the HSS, the network can indicate the correct P-GW address to the UE, for example, by using the Home Agent Switch message. Therefore, session continuity can be provided during handover.

Extended Procedure to Attach to Non-3GPP Access Network Before Handover

Figure 11:
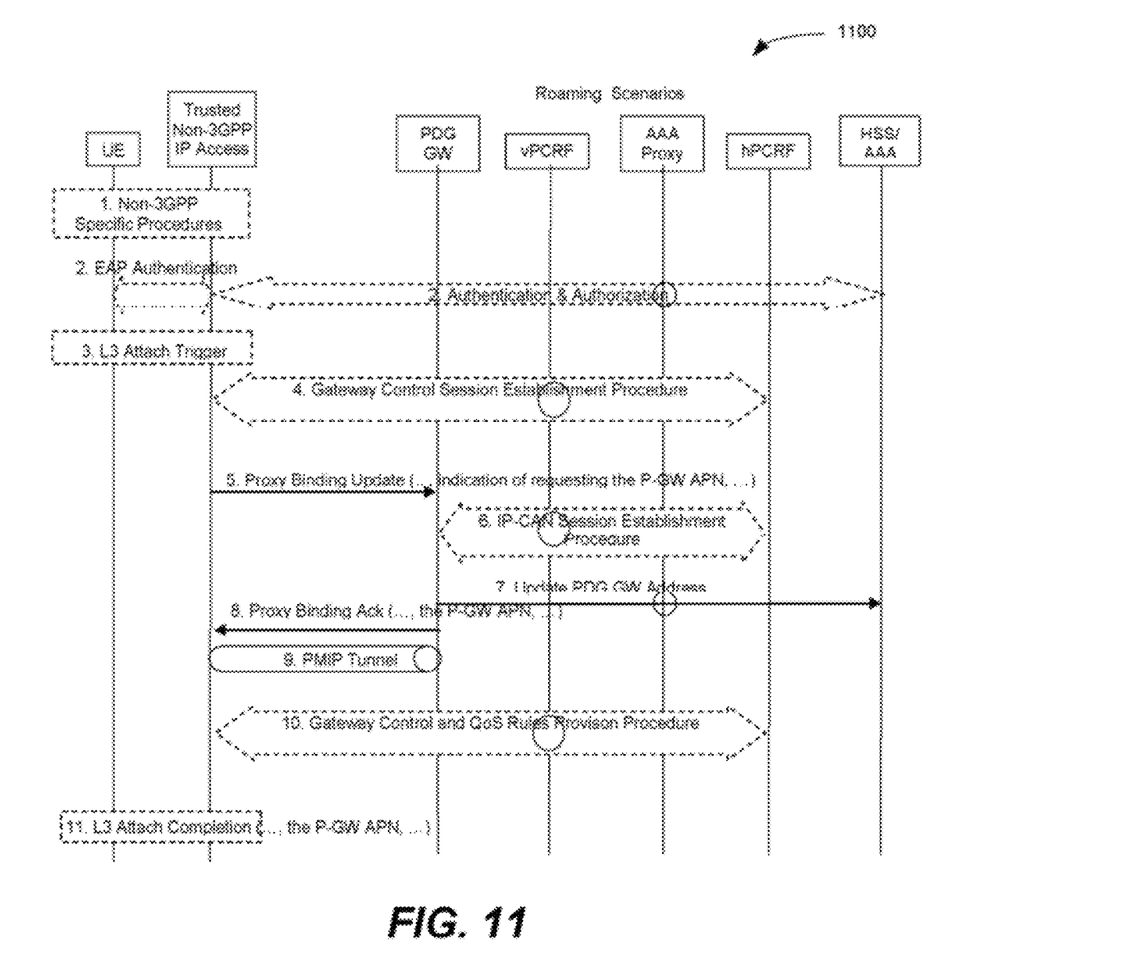

When attaching to the non-3GPP access, the network will provide the UE with the information of the selected P-GW, for example, called the P-GW APN. The P-GW APN can be in form of the concatenation of the selected P-GW identity and the APN, such as PGWx.APN. FIG. 11 illustrates an extended attach procedure 1100 to the non-3GPP access with s2a. Compared with the current 3GPP specification (TS 23.402), the attach procedure with s2a is extended with the following extensions. At step 5, the trusted non-3GPP access may learn that the UE is allowed to handover to the 3GPP access network from the user profile downloaded at the step 2, thus the access gateway in the trusted non-3GPP access requests the P-GW APN in the Proxy Binding Update optionally. Such request can be carried in either a mobility option or a PCO (Protocol Configuration Option). At step 8, in a response to the received request at the step 5, the P-GW APN can be returned in either a mobility option or a PCO in the Proxy Binding Ack message by the P-GW to the trusted access network. At step 11, the P-GW APN is returned to the UE in a way specific to the trusted non-3GPP access network.

Figure 12:
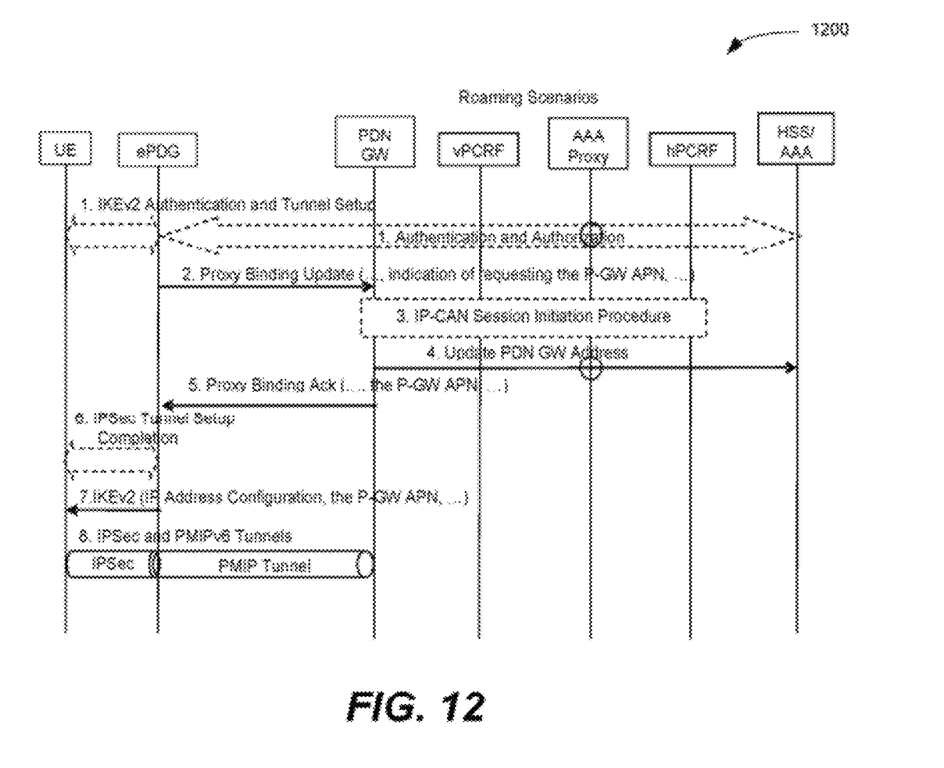
FIG. 12 illustrates an extended attach procedure to a non-3GPP access with s2b.

FIG. 12 illustrates an extended attach procedure 1200 to the non-3GPP access with s2b. Compared with the current 3GPP specification (TS 23.402), the attach procedure with s2b is extended with the following extensions. At step 2, the untrusted non-3GPP access may learn that the UE is allowed to handover to the 3GPP access network from the user profile downloaded at the step 1, thus the ePDG in the untrusted non-3GPP access requests the P-GW APN in the Proxy Binding Update optionally. Such request can be carried in either a mobility option or a PCO (Protocol Configuration Option). At step 5, in a response to the received request at the step 2, the P-GW APN can be returned in either a mobility option or a PCO in the Proxy Binding Ack message by the P-GW to the ePDG. At step 7, the P-GW APN is returned to the UE in the IKEv2 message, for example, carried in a specific payload or option or field in the IKEv2 message.

When the UE attaches to the trusted/untrusted non-3GPP access with s2c, the UE may request and receive the P-GW APN during the bootstrapping procedure (for example, during either the home agent discovery or the IPSec SA establishment procedure) or the binding update procedure (for example, carried in the mobility options in the binding update message and the binding acknowledgement message).

Handover from Non-3GPP Access Network to 3GPP Access Network with S4 Based SGSN

Figure 13:
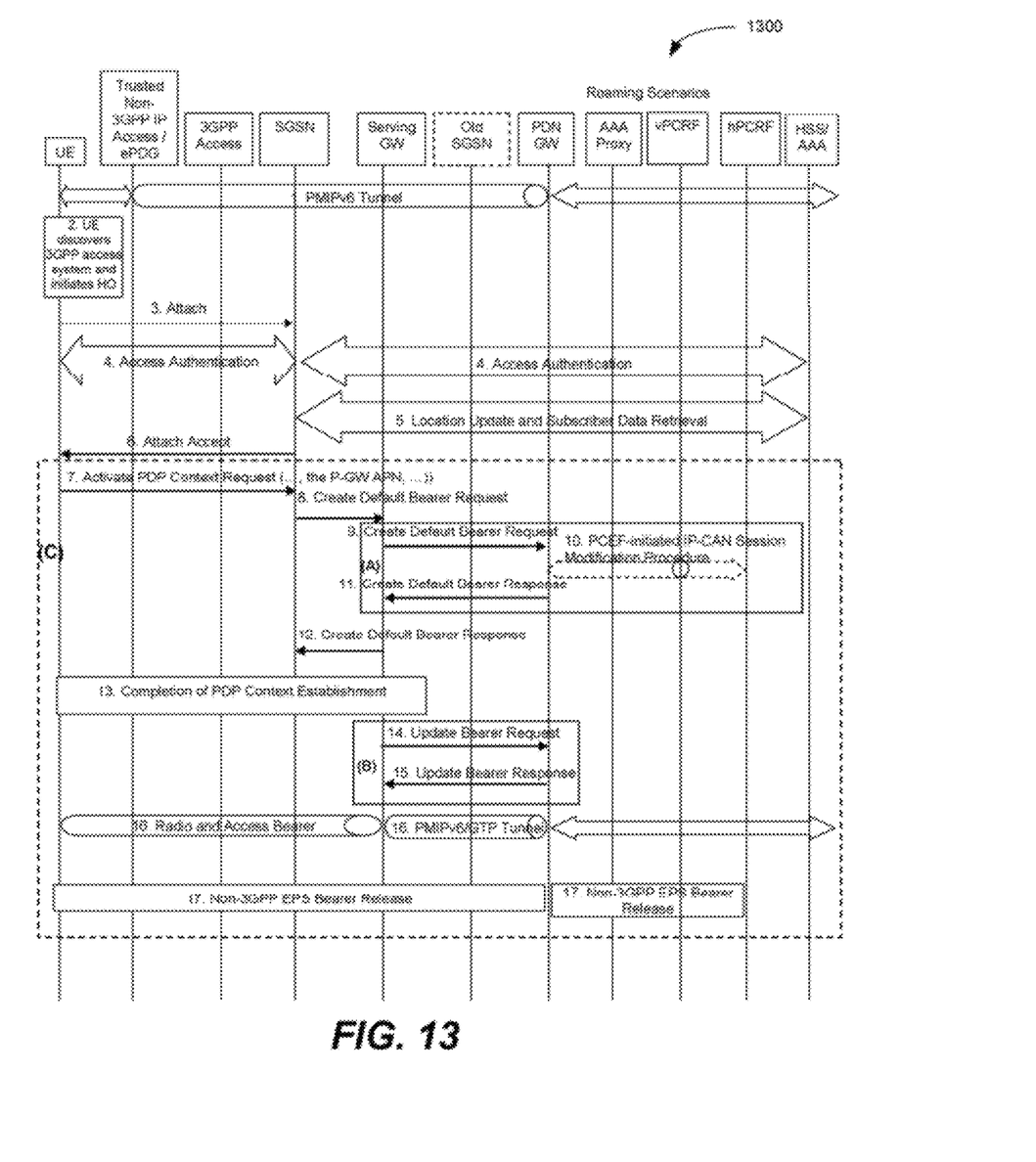
FIG. 13 illustrates a handover from a trusted/untrusted non-3GPP IP Access to UTRAN/GERAN with S4 based SGSN.

Since a UE may not know whether the SGSN in the 3GPP access network supports s4 or Gn/Gp, (in one implementation) the SGSN indicates the P-GW APN always in the Activate PDP Context Request message. FIG. 13 shows a procedure 1300 when the UE handovers to the 3GPP access network with the S4 based SGSN.

Compared with the current 3GPP specification (TS 23.402), the attach procedure with s2b is extended with the following extensions. At step 7, the UE indicates the P-GW APN in the Activate PDP Context Request message. As defined in the current specification (TS 23.402), the S4 based SGSN also receives the PGW identity information at the step 5. The S4 based SGSN can derive the PGW information from the received P-GW APN and then compare with the PGW identity information; therefore the same PDN GW used before will be connected during handover to maintain session continuity.

Figure 14:
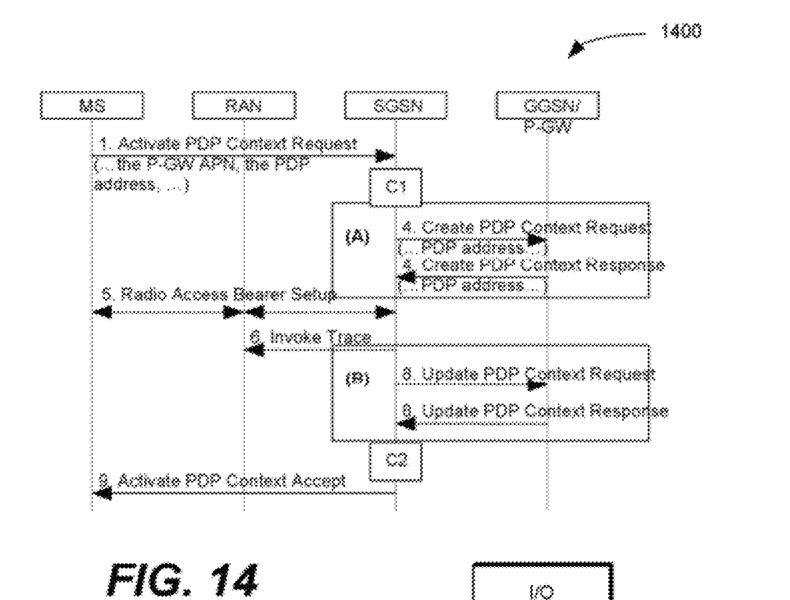
FIG. 14 illustrates an extended PDP context activation procedure for Iu mode.

Handover from Non-3GPP Access Network to 3GPP Access Network with Gn/Gp Based SGSN FIG. 14 shows an extended PDP context activation procedure 1400 for Iu mode performed when the UE handovers to the 3GPP access network with the Gn/Gp SGSN. Compared with the current 3GPP specification (TS 23.060), the PDP Context Activation Procedure for Iu mode is extended with the following extensions. At step 1, the UE indicates the P-GW APN and the PDP address in the Activate PDP Context Request message. The PDP address is set as the IP address that is obtained by the UE when on the non3GPP access before handover. At step 4, the SGSN derives the APN and the P-GW identity from the received P-GW APN. The SGSN sends the Create PDP Context Request message to the P-GW. In this message, the PDP address is set as the same IP address requested by the UE at the step 1. The GGSN/P-GW returns the same IP address to the SGSN in the Create PDP Context Response message. The same changes can be applied to the PDP Context Activation Procedure for A/Gb mode.

One or more of the procedure steps described above can be performed by one or more programmable processors executing a computer program to perform functions by operating on input data and generating output. Generally, the invention can take the form of an entirely hardware embodiment, an entirely software embodiment or an embodiment containing both hardware and software elements. In one implementation, the invention is implemented in software, which includes but is not limited to firmware, resident software, microcode, etc. Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

Figure 15:
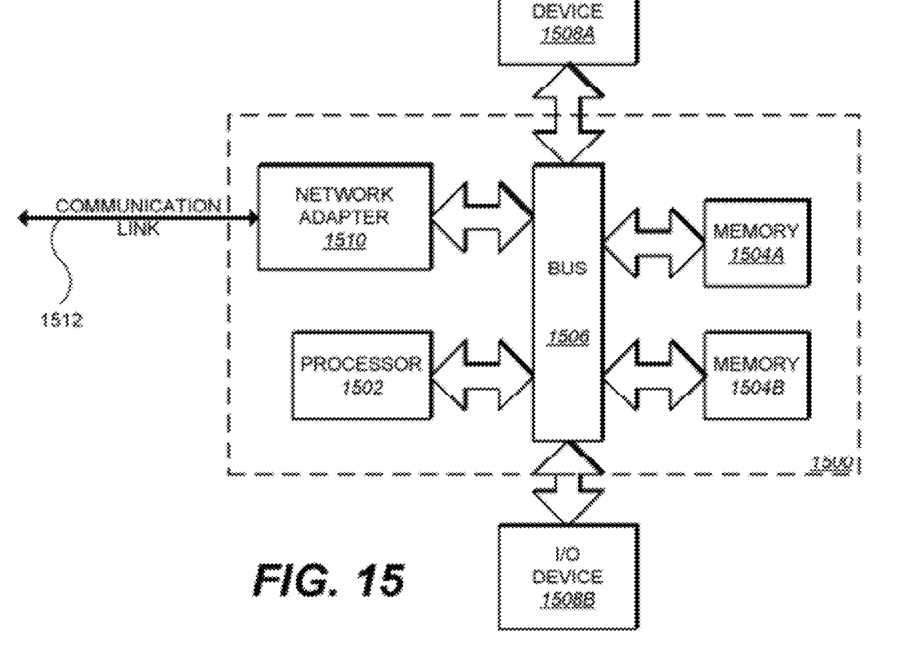
FIG. 15 is a block diagram of a data processing system suitable for storing and/or executing program code.

FIG. 15 illustrates a data processing system 1500 (e.g., a UE, enodeB, or mobile node) suitable for storing and/or executing program code. Data processing system 1500 includes a processor 1502 coupled to memory elements 1504A-B through a system bus 1506. In other implementations, data processing system 1500 includes more than one processor and each processor can be coupled directly or indirectly to one or more memory elements through a system bus. Memory elements 1504A-B can include local memory employed during actual execution of the program code, bulk storage, and cache memories that provide temporary storage of at least some program code in order to reduce the number of times the code must be retrieved from bulk storage during execution. As shown, input/output or I/O devices 1508A-B (including, but not limited to, keyboards, displays, pointing devices, etc.) are coupled to data processing system 1500. I/O devices 1508A-B may be coupled to data processing system 1500 directly or indirectly through intervening I/O controllers (not shown).

In one implementation, a network adapter 1510 is coupled to data processing system 1500 to enable data processing system 1500 to become coupled to other data processing systems or remote printers or storage devices through communication link 1512. Communication link 1512 can be a private or public network. Modems, cable modems, and Ethernet cards are just a few of the currently available types of network adapters.

Although the subject matter has been described in language specific to structural features and/or methodological operations, the subject matter defined in the appended claims is not necessarily limited to the specific features or acts described above, including orders in which the acts are performed.

What is claimed is:

1. A method for performing a handover of a communication session from a non-3GPP access network to a 3GPP access network, the method comprising:
    establishing the communication session between a user equipment and an Evolved Packet Core through the non-3GPP access network; and
    performing a handover of the communication session from the non-3GPP access network to the 3GPP access network, wherein performing the handover comprises
        prior to initiating the handover, providing, to the user equipment, information associated with a selected packet data network gateway, and
        during the handover, providing the information associated with the selected packet data network gateway from the user equipment to the 3GPP access network,
    wherein the information associated with the selected packet data network gateway comprises an identification of the selected packet data network gateway.

2. The method of claim 1, wherein the non-3GPP access network is a trusted non-3GPP access network.

3. The method of claim 1, wherein the non-3GPP access network is an untrusted non-3GPP access network.

4. The method of claim 1, wherein the 3GPP access network is one of E-UTRAN, UTRAN, UTRAN (3G), or GERAN (2G).

5. The method of claim 1, wherein the user equipment comprises a cellular phone.

6. The method of claim 1, wherein the 3GPP access network deploys a Gn/Gp-based Serving GPRS Support Node.

7. The method of claim 1, wherein the user equipment comprises a cellular phone.

8. A method comprising:
receiving, by a user equipment, information associated with a packet data network gateway, wherein the user equipment receives the information while the user equipment is engaged in a communication session with an Evolved Packet Core through a non-3GPP access network; and
participating, by the user equipment, in a handover of the communication session from the non-3GPP access network to a 3GPP access network, wherein the user equipment receives the information prior to an initialization of the handover of the communication session,
wherein the information associated with the selected packet data network gateway comprises an identification of the selected packet data network gateway.

9. The method of claim 8, further comprising:
providing, by the user equipment, the information to the 3GPP access network during the handover of the communication session.

10. The method of claim 8, wherein the information comprises an identification of the packet data network gateway.

11. The method of claim 8, wherein the 3GPP access network deploys a Gn/Gp-based Serving GPRS Support Node.

12. The method of claim 8, wherein the non-3GPP access network is a trusted non-3GPP access network.

13. The method of claim 8, wherein the non-3GPP access network is an untrusted non-3GPP access network.

14. The method of claim 8, wherein the 3GPP access network is one of E-UTRAN, UTRAN, UTRAN (3G), or GERAN (2G).

15. A method comprising:
participating, by a 3GPP access network, in a handover of a user equipment from a non-3GPP access network to the 3GPP access network;
receiving, by the 3GPP access network from the user equipment, information associated with a packet data network gateway of the 3GPP access network, wherein the user equipment is provided with the information prior to an initialization of the handover of the user equipment,
wherein the information associated with the selected packet data network gateway comprises an identification of the selected packet data network gateway.

16. The method of claim 15, wherein the information comprises an identification of the packet data network gateway.

17. The method of claim 15, wherein the non-3GPP access network is a trusted non-3GPP access network.

18. The method of claim 15, wherein the non-3GPP access network is an untrusted non-3GPP access network.

19. The method of claim 15, wherein the 3GPP access network is one of E-UTRAN, UTRAN, UTRAN (3G), or GERAN (2G).

* * * * *